United States Patent
Choi et al.

(10) Patent No.: US 10,329,033 B2
(45) Date of Patent: Jun. 25, 2019

(54) COLD SPRAY METHOD TO JOIN OR IN CERTAIN CASES STRENGTHEN METALS

(71) Applicant: Sikorsky Aircraft Corporation, Stratford, CT (US)

(72) Inventors: JinKyu Choi, Trumbull, CT (US); Aaron T. Nardi, East Granby, CT (US); Michael A. Klecka, Vernon, CT (US); Robert Guillemette, Durham, CT (US); Jeffrey Michael Mendoza, Manchester, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 74 days.

(21) Appl. No.: 15/543,269

(22) PCT Filed: Jan. 13, 2016

(86) PCT No.: PCT/US2016/013245
§ 371 (c)(1),
(2) Date: Jul. 13, 2017

(87) PCT Pub. No.: WO2016/115248
PCT Pub. Date: Jul. 21, 2016

(65) Prior Publication Data
US 2017/0369187 A1    Dec. 28, 2017

Related U.S. Application Data

(60) Provisional application No. 62/104,426, filed on Jan. 16, 2015.

(51) Int. Cl.
*B64F 5/40*    (2017.01)
*B23P 6/00*    (2006.01)
(Continued)

(52) U.S. Cl.
CPC .................. *B64F 5/40* (2017.01); *B22F 7/06* (2013.01); *B23P 6/00* (2013.01); *B23P 6/04* (2013.01);
(Continued)

(58) Field of Classification Search
CPC ...... B64F 5/40; B23P 6/00; B23P 6/04; B23P 2700/01; B22F 7/06; B22F 2003/247;
(Continued)

(56) References Cited

U.S. PATENT DOCUMENTS 5,156,321 A * 10/1992 Liburdi .................. B22F 7/062
228/119
5,806,751 A    9/1998 Schaefer et al.
(Continued)

FOREIGN PATENT DOCUMENTS

EP    1829988 A1    9/2007
EP    1980714 A2    10/2008
(Continued)

OTHER PUBLICATIONS

International Search Report for International Application No. PCT/US2016/013245; dated Mar. 11, 2016; 8 pages.
(Continued)

*Primary Examiner* — Bayan Salone
(74) *Attorney, Agent, or Firm* — Cantor Colburn LLP

(57) ABSTRACT

A method of repairing or, in certain cases, strengthening a metallic substrate at a damage site is provided and includes removing material from the substrate around the damage site to form a recess, and cold spraying particulate material into the recess to form a bead of deposited material.

13 Claims, 4 Drawing Sheets

(51) Int. Cl.
*B23P 6/04* (2006.01)
*B22F 7/06* (2006.01)
*C23C 24/04* (2006.01)
*F01D 5/00* (2006.01)
*B22F 3/24* (2006.01)

(52) U.S. Cl.
CPC .............. *C23C 24/04* (2013.01); *F01D 5/005* (2013.01); *B22F 2003/247* (2013.01); *B22F 2007/068* (2013.01); *B23P 2700/01* (2013.01); *F05D 2230/10* (2013.01); *F05D 2230/30* (2013.01); *Y02T 50/672* (2013.01)

(58) Field of Classification Search
CPC .... B22F 2007/068; F01D 5/005; C23C 24/04; F05D 2230/10; F05D 2230/30; Y10T 29/49748
USPC ......................................... 228/173.1; 118/680
See application file for complete search history.

(56) References Cited

U.S. PATENT DOCUMENTS

| | | | |
|---|---|---|---|
| 6,283,356 B1 * | 9/2001 | Messelling | B23K 35/0244 164/92.1 |
| 6,365,222 B1 | 4/2002 | Wagner et al. | |
| 7,367,488 B2 * | 5/2008 | Payne | B23P 6/007 228/119 |
| 7,622,178 B2 * | 11/2009 | Bogue | B29C 73/04 156/293 |
| 7,645,348 B2 | 1/2010 | Kinstler | |
| 8,231,936 B2 | 7/2012 | Song et al. | |
| 8,486,249 B2 * | 7/2013 | Almond | C23C 24/04 205/109 |
| 8,703,233 B2 | 4/2014 | Miller et al. | |
| 8,777,090 B2 | 7/2014 | Miller et al. | |
| 2002/0066770 A1 * | 6/2002 | James | B22F 5/04 228/119 |
| 2003/0173460 A1 | 9/2003 | Chapman | |
| 2006/0255100 A1 * | 11/2006 | Payne | B23P 6/007 228/119 |
| 2007/0240819 A1 * | 10/2007 | Bogue | B29C 73/04 156/307.7 |
| 2010/0170937 A1 | 7/2010 | Calla | |
| 2010/0187119 A1 * | 7/2010 | Almond | C23C 24/04 205/115 |
| 2013/0086784 A1 | 4/2013 | Bunker | |
| 2013/0264013 A1 | 10/2013 | Miller et al. | |
| 2014/0115854 A1 | 5/2014 | Widener et al. | |
| 2014/0127400 A1 | 5/2014 | Zanon et al. | |
| 2014/0263853 A1 | 9/2014 | Jackson et al. | |

FOREIGN PATENT DOCUMENTS

| | | | |
|---|---|---|---|
| EP | 2584056 A1 | 4/2013 | |
| EP | 2873620 | * 11/2013 | ................ B64F 5/00 |
| JP | 2008274352 A | 11/2008 | |

OTHER PUBLICATIONS

Written Opinion of the International Search Report for International Application No. PCT/US2016/013245; dated Mar. 11, 2016; 6 pages.

EP Search Report, EP 16737815.7; dated Jul. 31, 2018; 8 pages.

* cited by examiner

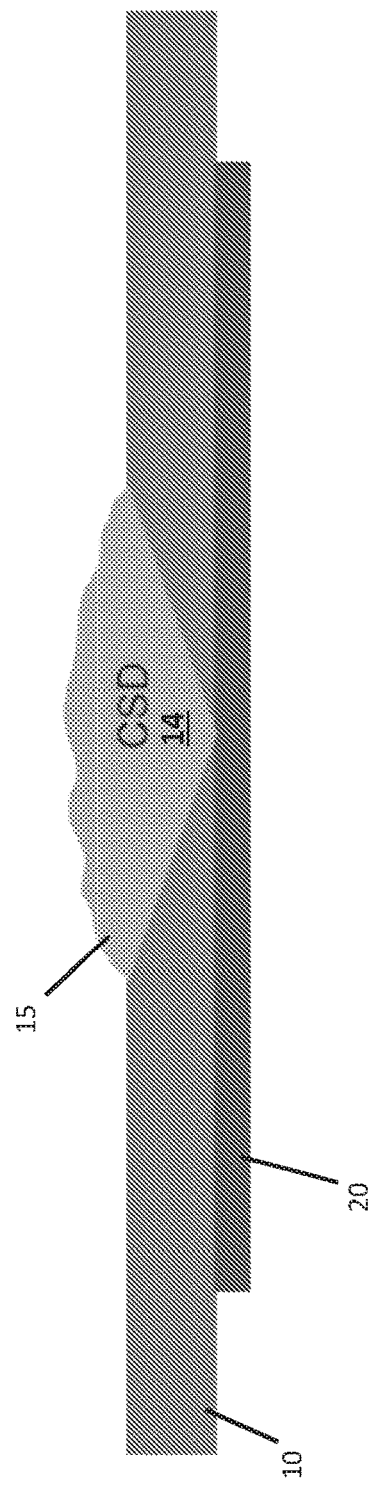
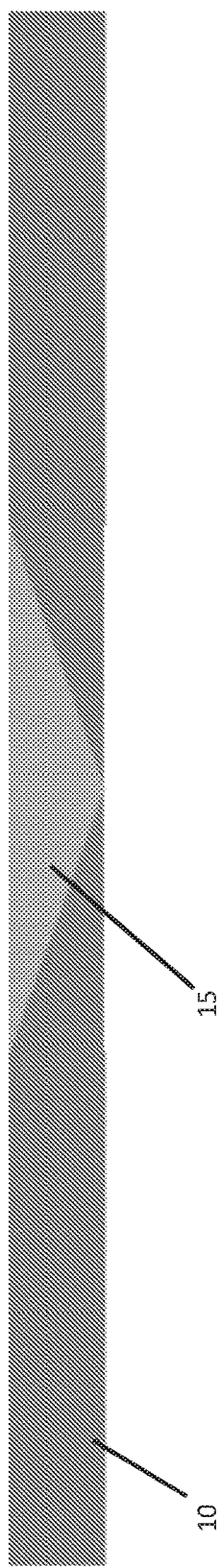

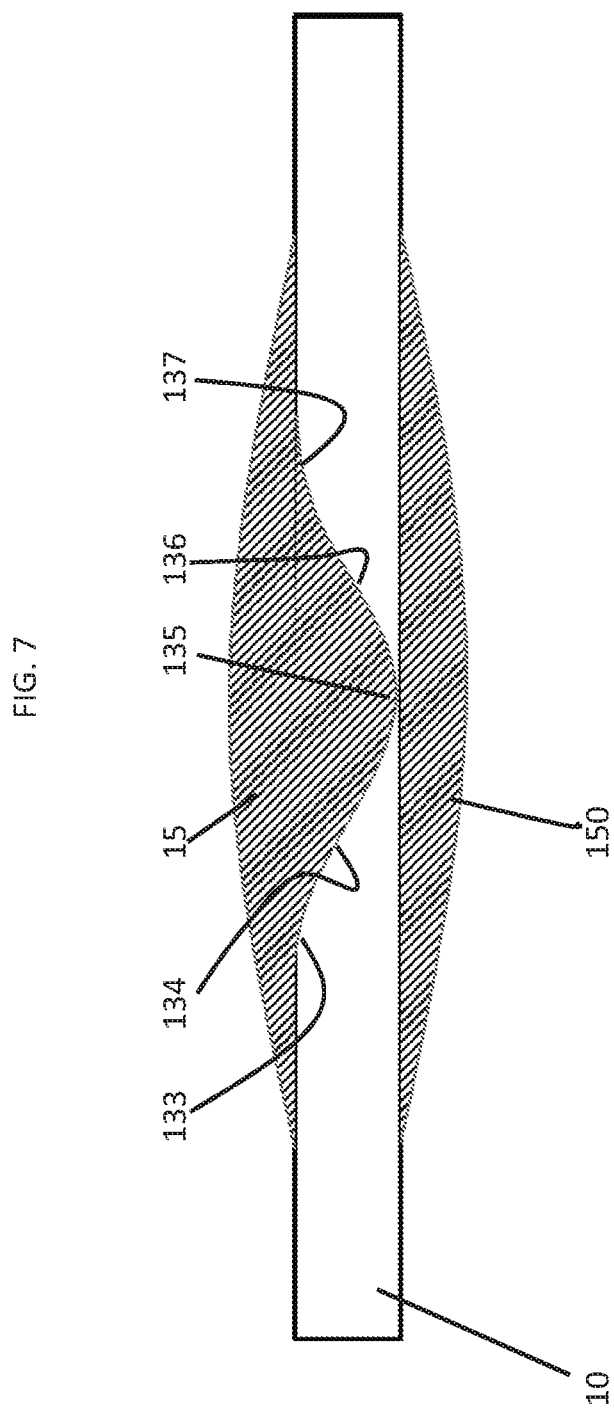

US 10,329,033 B2

COLD SPRAY METHOD TO JOIN OR IN CERTAIN CASES STRENGTHEN METALS

CROSS REFERENCE TO RELATED APPLICATIONS

This application is a National Stage application of PCT/US2016/013245, filed Jan. 13, 2016, which claims the benefit of U.S. Provisional Application No. 62/104,426, filed Jan. 16, 2015, both of which are incorporated by reference in their entirety herein.

BACKGROUND OF THE INVENTION

The subject matter disclosed herein relates to a cold spray method and, more particularly, to a cold spray method used to join or, in certain cases, strengthen metals or metallic substrates.

When an airframe metallic structural beam, for example, is fatigue cracked, repair or replacement of the cracked beam is often a costly process. The high cost of the process arises from the nature of the repair or replacement, which includes cutting out the cracked section and replacing it with a support structure, reinforcing the cracked section with multiple riveted doublers or replacing the beam entirely.

BRIEF DESCRIPTION OF THE INVENTION

According to one aspect of the invention, a method of repairing or, in certain cases, strengthening a metallic substrate at a damage site is provided and includes removing material from the substrate around the damage site to form a recess and cold spraying particulate material into the recess to form a bead of deposited material.

According to additional or alternative embodiments, a ratio of cross-sectional areas of the bead and the substrate is greater than a ratio of a strength of the substrate to a strength of the bead.

According to additional or alternative embodiments, a ratio of a total bond area between the bead and the substrate to the cross-sectional area of the substrate is greater than a ratio of the strength of the substrate to a bond strength between the bead and the substrate.

According to additional or alternative embodiments, the bead includes rounded corners having a radius of at least 0.5 times an exit diameter of a nozzle from which the particulate material is cold sprayed.

According to additional or alternative embodiments, the method further includes machining the bead to planarize the bead.

According to additional or alternative embodiments, the method further includes machining the bead to smooth the bead.

According to additional or alternative embodiments, the method further includes clamping a doubler to the substrate at the damage site, machining the doubler and machining the bead to planarize the bead.

According to additional or alternative embodiments, the removing of the material from the substrate includes forming a tapered recess in the substrate.

According to additional or alternative embodiments, the removing of the material from the substrate includes forming the recess in the substrate with chamfered edges and rounded corners.

According to additional or alternative embodiments, an angling of the recess is defined in accordance with a type of the particulate material and a velocity of the cold spraying.

According to another aspect, an in situ method of repairing or, in certain cases, strengthening an aluminum substrate at a damage site is provided and includes removing material from the substrate around the damage site to form a tapered recess having narrow and wide ends at first and second opposite sides of the substrate, respectively, clamping a doubler to the first side of the substrate at the damage site and cold spraying particulate material into the recess against the doubler to form a bead.

According to additional or alternative embodiments, the method further includes inspecting the substrate to identify the damage site.

According to additional or alternative embodiments, the method further includes machining the doubler and machining the bead to planarize the bead.

According to additional or alternative embodiments, the removing of the material from the substrate includes forming the tapered recess with chamfered edges and rounded corners.

According to additional or alternative embodiments, an angling of the chamfered edges is defined in accordance with a type of the particulate material and a velocity of the cold spraying.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a side schematic view of a bead formed of particulate material having been cold sprayed into a recess formed in the metallic substrate of FIG. 4;

FIG. 6 is a side schematic view of the bead and doubler of FIG. 5 having been machined; and FIG. 7 is a side schematic view of a bead in accordance with alternative embodiments.

Figure 1:
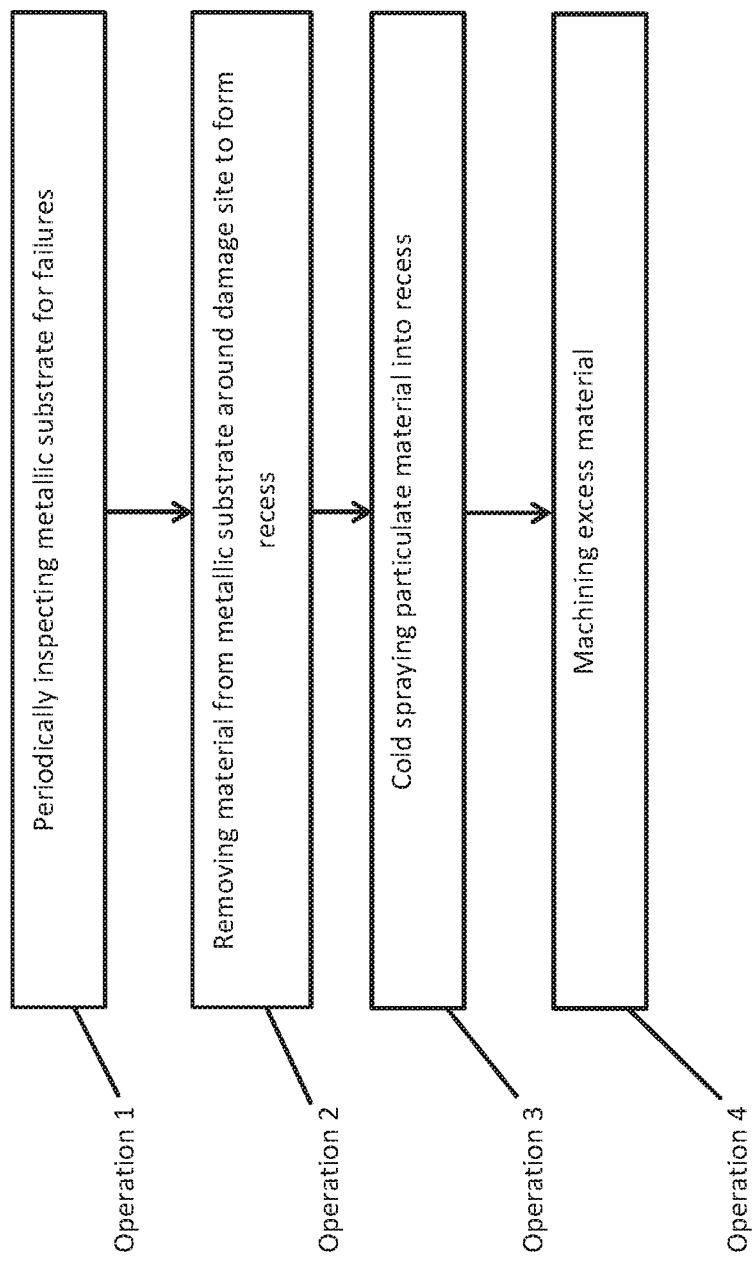
FIG. 1 is a flow diagram illustrating a method of repair or reinforcing a metallic substrate in accordance with embodiments.
Figure 2:
FIG. 2 is a side schematic view of a metallic substrate.
Figure 3:
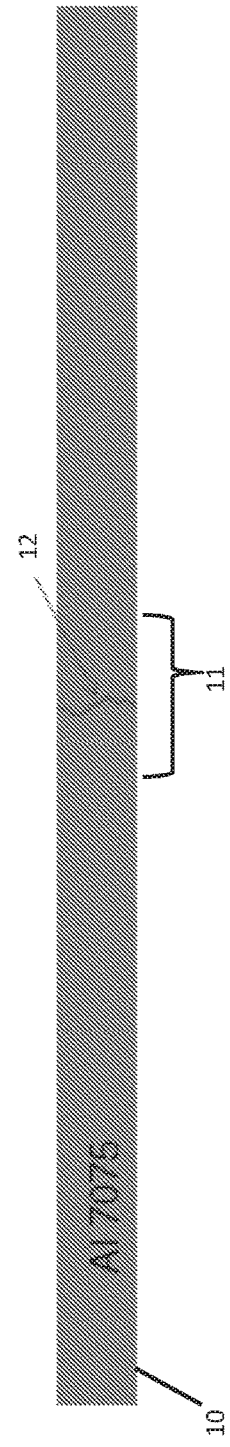
FIG. 3 is a side schematic view of a metallic substrate with a crack.

The detailed description explains embodiments of the invention, together with advantages and features, by way of example with reference to the drawings.

DETAILED DESCRIPTION OF THE INVENTION

As described herein, a method of on-aircraft repair of a damaged component such as a metallic airframe beam using cold spray of a particulate material is provided. The method avoids, eliminates or bypasses costly repair procedures and enhances the structural integrity of the airframe by preventing unwarranted damages resulting from prolonged high cycle fatigue loads being applied thereto.

With reference to FIGS. 1-6, a method of repairing or, in certain cases, strengthening a metallic substrate 10 at a damage site 11 of the metallic substrate 10 is provided. As shown, the method includes periodically inspecting the metallic substrate 10 for failures, such as cracks 12 (operation 1). Upon identifying and locating such cracks 12, the method includes removing material from the metallic substrate 10 around the damage site 11 to form a recess 13 (operation 2) and then cold spraying particulate material 14 (see FIG. 5) into the recess 13 to form a bead 15 of deposited material (operation 3). At this point, the method may in some cases include machining the bead 15 (operation 4) to either planarize the bead 15 or to simply smooth the bead 15 for further processing. The machining of the bead 15 is optional, however, as the deposited material can be left as sprayed or merely surface finished (e.g., by bead blasting or shot peening).

The method described above and in the following paragraphs may be performed in situ. That is, the removal of the material from the metallic substrate 10 or operation 2, the cold spraying of the particulate material of operation 3 and the machining of operation 4 may be performed at the location where the failures are identified, found or discovered (i.e., in a hangar or on a naval ship). Also, the metallic substrate 10 may be formed of various metals, metallic alloys and similar suitable materials. In accordance with embodiments, the metallic substrate 10 is formed of aluminum or, more particularly, aluminum 7075.

The recess 13 may be provided as a tapered recess 130 with a narrow end portion 131 at a first side 101 of the metallic substrate 10 and a wide end portion 132 at a second side 102 of the metallic substrate. In accordance with this and other embodiments and, with reference to FIGS. 4-6, the method may include but is not required to include clamping a doubler 20 to the first side 101 of the metallic substrate 10 at the damage site prior to or following the removal of the material from the metallic substrate 10 in operation 101. Where the doubler 20 is used, the clamping is achieved using first and second clamps 201 with the doubler 20 thus positioned adjacent to the narrow end portion 131 of the recess 13. As such, the doubler 20 serves to prevent leakage of the cold sprayed particulate material through any hole or aperture formed in the recess 13 or, more particularly, the narrow end portion 131.

In a case where the doubler 20 is clamped to the metallic substrate, the machining of operation 4 may include machining the doubler 20 as well as the bead 15.

Figure 4:
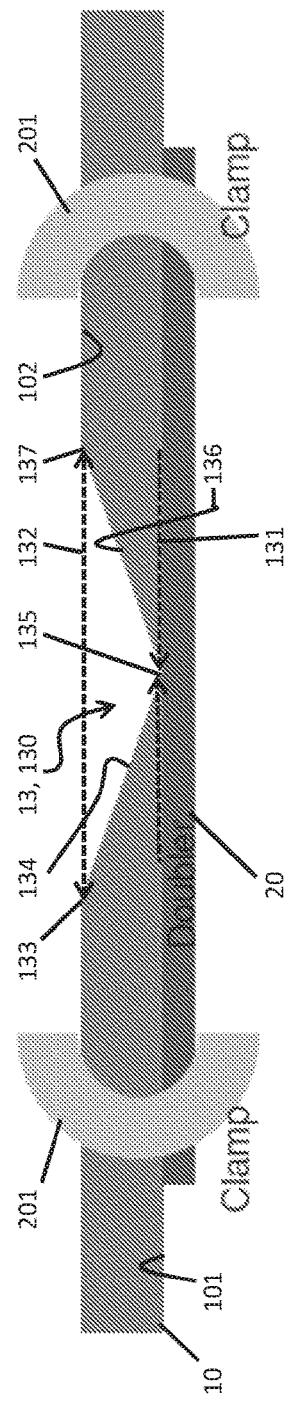
FIG. 4 is a side schematic view of a doubler clamped to the metallic substrate of FIG. 3.

As shown in FIG. 4, where the recess 13 is provided as a tapered recess 130, the removing of the material from the metallic substrate 10 of operation 2 may include forming the tapered recess 130 in the metallic substrate 10 with a first corner 133, a first chamfered edge 134, a second corner 135, a second chamfered edge 136 and a third corner 137. The first chamfered edge 134 runs from the second side 102 of the metallic substrate 10 to the first side 101 and the second chamfered edge 136 runs from the end of the first chamfered edge 134 at the first side 101 to the second side 102. The first chamfered edge 134 thus forms the first corner 133 with the second side 102 and the second corner 135 with the second chamfered edge 136 while the second chamfered edge 136 forms the third corner 137 with the second side 102. In accordance with embodiments, the first corner 133, the second corner 135 and the third corner 137 may be rounded with a radius that is sufficient to reduce local stress concentrations.

The cold spraying of the particulate material of operation 3 may be performed as a gas dynamic cold spray (GDCS) coating deposition method. In this case, solid powders (e.g., metals, such as Al 7075 powder, polymers, ceramics, composite materials and nanocrystalline powders of 1 to 50 micrometers in diameter) are accelerated in a supersonic gas jet to velocities up to 500-1000 m/s. During impact with the metallic substrate 10, the solid powder particles undergo plastic deformation and adhere to the surface of the metallic substrate 10 without substantially heating the metallic substrate 10 or the particulate material.

Thus, in order for the cold spraying of the particulate material to effectively form the bead 15 where the recess 13 is provided as the tapered recess 130, an angling of the first and second chamfered edges 134 and 136 relative to the first and second sides 101 and 102 is defined in accordance with a type of the particulate material and a velocity of the cold spraying. That is, while the angling should be reasonably large or steep in order to limit an overall width of the tapered recess 130 along a longitudinal length of the metallic substrate 10, the angling needs to be shallow enough to encourage the plastic deformation and adherence of the particulate material. Moreover, the angling needs to be designed such that a bond strength of the bead 15 to the metallic substrate 10 at bond lines defined along the first and second chamfered edges 134, 136 is capable of carrying an expected loading of the material of the underlying metallic substrate 10.

With reference to FIG. 7, it will be understood that the doubler 20 need not be clamped to the metallic substrate 10 and, in this case, a portion of the cold sprayed particulate material will leak through the second corner 135. The resulting bead 15 will thus include a secondary bead 150 at least at an intermediate operations step (i.e., prior to the machining of operation 4). In this case, a first ratio of cross-sectional areas of the bead 15 (and the secondary bead 150) and the metallic substrate 10 is greater than a second ratio of a strength of the metallic substrate 10 to a strength of the bead 15 (and the secondary bead 150). In accordance with embodiments, a third ratio between the first ratio and the second ratio may be in the range of 1:1 to 2:1. Also, a fourth ratio of a total bond area between the bead 15 (and the secondary bead 150) and the metallic substrate 10 to the cross-sectional area of the metallic substrate 10 is greater than a fifth ratio of the strength of the substrate to a bond strength between the bead 15 (and the secondary bead 150) and the metallic substrate 10. In accordance with embodiments, a sixth ratio between the fourth ratio and the fifth ratio may be about 2:1 to 8:1. Further, the first corner 133, the second corner 135 and the third corner 137 may be rounded and may have radii of at least 0.5 times an exit diameter of a nozzle from which the particulate material is cold sprayed. Here, the radii may be reduced if non-optimum properties are deemed satisfactory.

The descriptions provided above may relate to technology for service life extension programs (SLEPs) where extensive airframe replacement/modification procedures are required. On-Aircraft cold spray-assisted SLEP will be a cost effective alternative to conventional SLEP approaches and may be usable in cases where cracks are not developed but cold spray coatings can nevertheless be applied to areas frequently experiencing overloaded stress. This may improve the fatigue life of the structure, thus improving the service life of the airframe.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of repairing or, in certain cases, strengthening a metallic substrate at a damage site, comprising:
   removing material from the substrate around the damage site to form a recess having chamfered edges and rounded corners; and
   cold spraying particulate material into the recess to form a bead of deposited material.

2. The method according to claim 1, wherein a ratio of cross-sectional areas of the bead and the substrate is greater than a ratio of a strength of the substrate to a strength of the bead.

3. The method according to claim 1, wherein a ratio of a total bond area between the bead and the substrate to the cross-sectional area of the substrate is greater than a ratio of the strength of the substrate to a bond strength between the bead and the substrate.

4. The method according to claim 1, wherein the bead comprises rounded corners having a radius of at least 0.5 times an exit diameter of a nozzle from which the particulate material is cold sprayed.

5. The method according to claim 1, further comprising machining the bead to planarize the bead.

6. The method according to claim 1, further comprising machining the bead to smooth the bead.

7. The method according to claim 1, further comprising:
   clamping a doubler to the substrate at the damage site;
   machining the doubler; and
   machining the bead to planarize the bead.

8. The method according to claim 1, wherein the removing of the material from the substrate comprises forming a tapered recess in the substrate.

9. The method according to claim 8, wherein an angling of the recess is defined in accordance with a type of the particulate material and a velocity of the cold spraying.

10. An in situ method of repairing or, in certain cases, strengthening an aluminum substrate at a damage site, comprising:
    removing material from the substrate around the damage site to form a tapered recess having chamfered edges and rounded corners and narrow and wide ends at first and second opposite sides of the substrate, respectively;
    clamping a doubler to the first side of the substrate at the damage site; and
    cold spraying particulate material into the recess against the doubler to form a bead.

11. The method according to claim 10, further comprising inspecting the substrate to identify the damage site.

12. The method according to claim 10, further comprising:
    machining the doubler; and
    machining the bead to planarize the bead.

13. The method according to claim 10, wherein an angling of the chamfered edges is defined in accordance with a type of the particulate material and a velocity of the cold spraying.

* * * * *